United States Patent
Duplessie et al.

(10) Patent No.: US 12,377,350 B2
(45) Date of Patent: Aug. 5, 2025

(54) ACTION PATH CREATION ASSISTANT

(71) Applicant: SONY INTERACTIVE ENTERTAINMENT INC., Tokyo (JP)

(72) Inventors: Alex Duplessie, San Mateo, CA (US); Victoria Dorn, San Mateo, CA (US); Celeste Bean, San Mateo, CA (US); Ritagya Meharishi, San Mateo, CA (US); Kristie Ramirez, San Mateo, CA (US); Tooba Ahsen, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 85 days.

(21) Appl. No.: 18/231,089

(22) Filed: Aug. 7, 2023

(65) Prior Publication Data

US 2025/0050217 A1    Feb. 13, 2025

(51) Int. Cl.
*A63F 13/57* (2014.01)
*A63F 13/5378* (2014.01)

(52) U.S. Cl.
CPC .......... *A63F 13/57* (2014.09); *A63F 13/5378* (2014.09); *A63F 2300/5553* (2013.01)

(58) Field of Classification Search
CPC .................. A63F 13/57; A63F 13/5378; A63F 2300/5553
USPC .......................................................... 463/31
See application file for complete search history.

(56) References Cited

U.S. PATENT DOCUMENTS

| | | | |
|---|---|---|---|
| 6,359,622 | B1 | 3/2002 | Hayes-Roth |
| 9,824,500 | B2 * | 11/2017 | Schoenberg .......... A63F 13/213 |
| 2020/0218426 | A1 * | 7/2020 | Ekambaram .......... A63F 13/216 |
| 2020/0294311 | A1 | 9/2020 | Holz et al. |
| 2022/0130094 | A1 | 4/2022 | Miller, IV |

FOREIGN PATENT DOCUMENTS

WO PCT/US2024/033649    6/2024

OTHER PUBLICATIONS

PCT Application No. PCT/US2024/033649, International Search Report and Written Opinion dated Sep. 16, 2024.

* cited by examiner

*Primary Examiner* — Allen Chan
(74) *Attorney, Agent, or Firm* — Kilpatrick Townsend & Stockton LLP

(57) ABSTRACT

A system uses map data of a virtual environment and object data of an avatar object including a moveset to generate an action path for traversal of the virtual environment by the avatar object. The system applies machine learning model(s) to generate one or more pathways through the virtual environment, and decompose the one or more pathways into one or more pathway segments that can be evaluated for feasibility and other factors. The system can iteratively generate and evaluate a move sequence of the action path having one or more parameters for execution by the avatar object. The system can construct the action path by combination of a plurality of pathway segments to satisfy one or more constraints associated with traversal by the avatar object from a start location to a destination location within the virtual environment.

20 Claims, 9 Drawing Sheets

ACTION PATH CREATION ASSISTANT

BACKGROUND OF THE INVENTION

1. Field of Invention

The present invention generally relates to systems for quality assurance of interactive video game level design. More specifically, the present invention relates to iteratively generating and testing action paths for traversal of an avatar through a map of a video game level based on known "moveset" attributes of the avatar.

2. Description of the Related Art

Quality assurance (QA) in video game design is imperative to ensure that a title is well-received by the public upon release. Levels must be traversed by the player avatar as intended by the developers. The gaming community can be highly critical of new game title releases if a level is not sufficiently QA-tested before release or upon integration with other aspects of the game. The process of developing a level can involve a lot of "guesswork" with respect to how the level can be traversed by the player avatar. Even with currently available modeling and optimization tools and especially with the advent of procedural generation for level design, developers must reserve considerable amounts of resources for iterative testing (usually by human QA play-testers) and adjusting aspects of a level.

Therefore, there is a need to streamline iterative level design and testing processes involved in level design for game titles.

SUMMARY OF THE CLAIMED INVENTION

A method for generating an action path is disclosed. The method may include accessing, by a processor in communication with a memory, information including: map data of a virtual environment; and object data of an avatar object including moveset information of the avatar object. The method may also include generating, for an iteration of a plurality of iterations, a pathway segment between a first location and a second location of an action path for traversal by the avatar object, the action path including a start location and a destination location. The method may further include generating, for the iteration, a move sequence having one or more parameters for execution by the avatar object for traversal of the pathway segment. The method may include assessing a feasibility of traversal of the pathway segment by the avatar object based on the move sequence, the map data, and the object data of the avatar object. Further, the method may include constructing the action path by combination of a plurality of pathway segments such that the action path satisfies one or more constraints associated with traversal by the avatar object from a start location to a destination location within the virtual environment.

A system for generating an action path is disclosed. The system includes a memory and a processor that executes instructions stored in memory, wherein execution of the instructions by the processor may access information including: map data of a virtual environment; and object data of an avatar object including moveset information of the avatar object. The execution of the instructions by the processor also may cause the processor to generate, for an iteration of a plurality of iterations, a pathway segment between a first location and a second location of an action path for traversal by the avatar object, the action path including a start location and a destination location. The execution of the instructions by the processor also may cause the processor to generate, for the iteration, a move sequence having one or more parameters for execution by the avatar object for traversal of the pathway segment. The execution of the instructions by the processor also may cause the processor to assess a feasibility of traversal of the pathway segment by the avatar object based on the move sequence, the map data, and the object data of the avatar object. The execution of the instructions by the processor also may cause the processor to construct the action path by combination of a plurality of pathway segments such that the action path satisfies one or more constraints associated with traversal by the avatar object from a start location to a destination location within the virtual environment.

A non-transitory computer-readable storage medium, having embodied thereon a program executable by a processor to perform a method for generating an action path is disclosed. The method may include accessing, by a processor in communication with a memory, information including: map data of a virtual environment; and object data of an avatar object including moveset information of the avatar object. The method may also include generating, for an iteration of a plurality of iterations, a pathway segment between a first location and a second location of an action path for traversal by the avatar object, the action path including a start location and a destination location. The method may further include generating, for the iteration, a move sequence having one or more parameters for execution by the avatar object for traversal of the pathway segment. The method may include assessing a feasibility of traversal of the pathway segment by the avatar object based on the move sequence, the map data, and the object data of the avatar object. Further, the method may include constructing the action path by combination of a plurality of pathway segments such that the action path satisfies one or more constraints associated with traversal by the avatar object from a start location to a destination location within the virtual environment.

DETAILED DESCRIPTION

Embodiments of the present invention include systems and methods for generating an action path is disclosed. A method implemented by the systems outlined herein may include accessing, by a processor in communication with a memory, interactive content data including: map data of a virtual environment; and object data of an avatar object including moveset information of the avatar object. The method may also include generating, for an iteration of a plurality of iterations, a pathway segment between a first location and a second location of an action path for traversal by the avatar object, the action path including a start location and a destination location. The method may further include generating, for the iteration, a move sequence having one or more parameters for execution by the avatar object for traversal of the pathway segment. The method may include assessing a feasibility of traversal of the pathway segment by the avatar object based on the move sequence, the map data, and the object data of the avatar object. Further, the method may include constructing the action path by combination of a plurality of pathway segments such that the action path satisfies one or more constraints associated with traversal by the avatar object from a start location to a destination location within the virtual environment.

Figure 1:
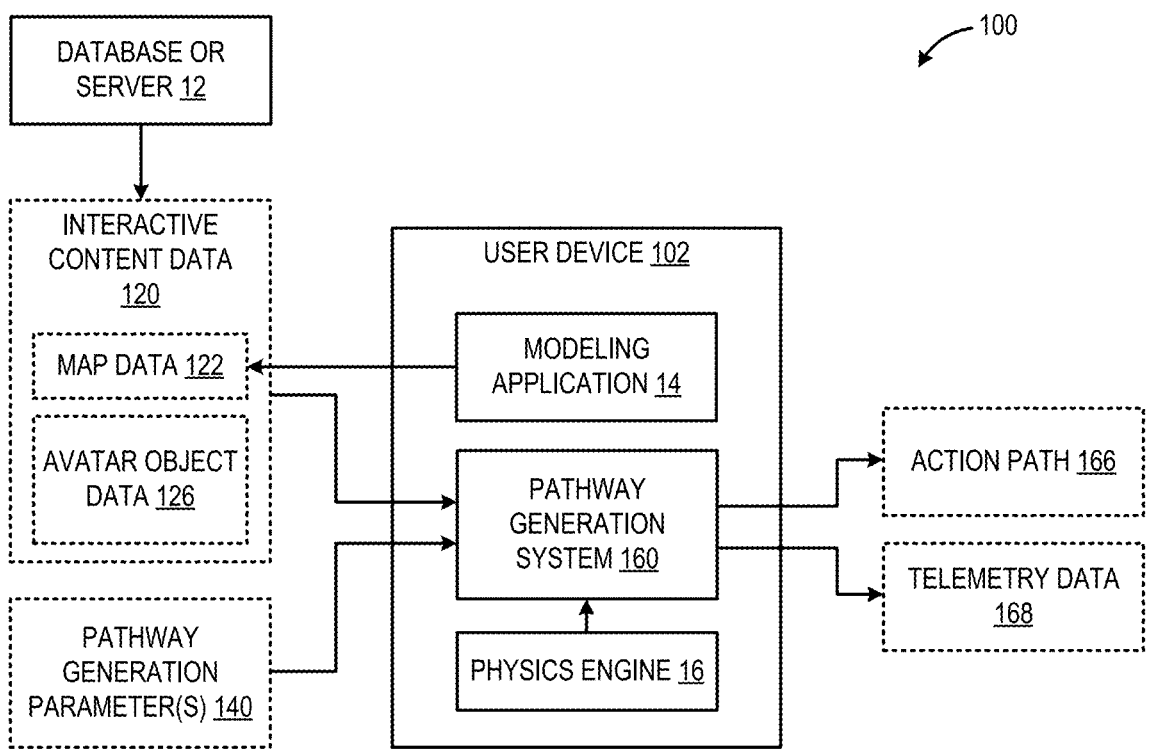
FIG. 1 illustrates an exemplary network environment in which a system for action path generation for traversal of an avatar object through a virtual environment may be implemented.

FIG. 1 illustrates an example network environment 100 in which a system for action path generation for traversal of an avatar object through a virtual environment may be implemented. The design environment 100 may include a user device 102 that accesses or otherwise receives interactive content data 120 for action path creation during a development process for the video game level. The interactive content data 120 can include map data 122 for a virtual environment and avatar object data 126 that describes known attributes of an avatar object along with moveset information of the avatar object. In some examples, the interactive content data 120 can be obtained from a database or server 12 over a network. The user device 102 may also run a modeling application 14 for generating the map data 122, and may include a physics engine 16 that provides a framework for how the avatar object and other objects move through and interact with aspects of the virtual environment. As shown, user device 102 implements a pathway generation system 160 that accesses the interactive content data 120 and generates one or more action paths 166 associated with traversal of an avatar object through the virtual environment based on the interactive content data 120.

In some examples, the pathway generation system 160 can access, select, and/or adjust pathway generation parameter(s) 140 associated with traversal such as start and destination locations, approach speeds and angles, and move sequences. The pathway generation parameter(s) 140 can also include, for example, expected parameters of a console or other device that consumers will use to play the video game level. Other pathway generation parameter(s) 140 that may be considered by the pathway generation system 160 can include constraints on the action path(s) 166 such as those associated with time to complete, difficulty, in-game or real-life skills required, restricted areas, etc.

As discussed in greater detail herein, the pathway generation system 160 can include various machine-learning (ML) models that can be used to optimize the development process, such as finding and optimizing pathway generation parameter(s) 140 and/or action path(s) 166. When finding action path(s) 166, the pathway generation system 160 can generate one or more pathways between a start location and a destination location, decompose the pathway(s) into one or more pathway segments, and evaluate the pathway segment(s) for feasibility and/or with respect to one or more constraints.

In some examples, the pathway generation system 160 can simulate traversal of the virtual environment by the avatar object, and can generate telemetry data 168 that describes traversal of the virtual environment by the avatar object for further analysis by developers. ML models may be implemented for reducing resource consumption by assessing feasibility of a pathway and avoiding simulating pathway segments and parameters that are infeasible.

As such, the pathway generation system 160 can enable machine-learning assisted testing and validation for map data 122 that can be generated manually or can be AI-assisted or procedurally-generated. The pathway generation system 160 aims to reduce "guesswork" involved in level design. By iterating through possible pathways using known attributes of the avatar object, the pathway generation system 160 can evaluate possible pathways that may be taken by human players to help developers forsee and correct problems with level design and traversal. The pathway generation system 160 can help determine if, and to what degree of ease, the avatar object can traverse the virtual environment so that developers can make necessary changes.

In one aspect, the pathway generation system 160 can be applied to ensure that the avatar object can or cannot reach a particular location. For example, the pathway generation system 160 may be employed to determine if an avatar object would (or wouldn't) be able to return to a location associated with an intended pathway if they fall off, drop down, or get stuck. This can help inform developers whether they should re-work parts of the map and/or set piece(s) to ensure that the player can or cannot return to the location. In another example, the pathway generation system 160 can be applied to ensure that some locations remain off-limits to the avatar object, such as ensuring that the avatar object cannot climb up to out-of-bounds areas or to areas that could trivialize a level or interfere with storylines, etc. In some examples, the pathway generation system 160 can be applied for development of navigation meshes (e.g., for AI-controlled enemies, creatures and/or NPCs) by determining pathways that can and cannot be traversed.

Figure 2:
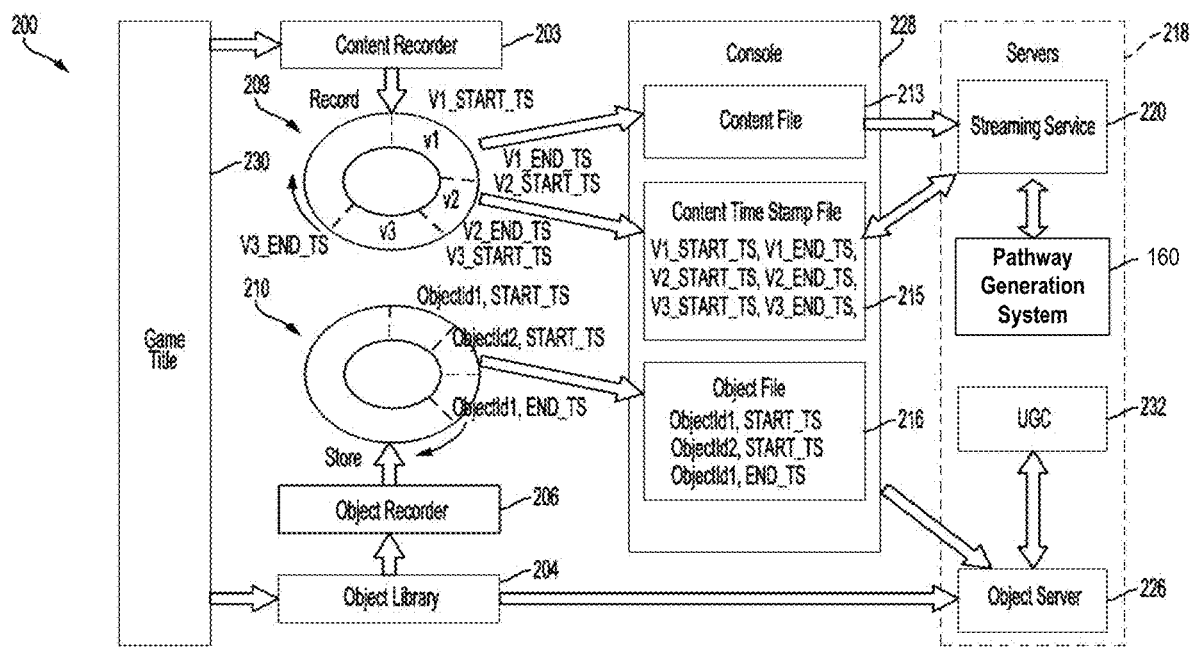
FIG. 2 illustrates an exemplary uniform data system (UDS) that may be used to provide data to a system for action path generation via a content recorder.

FIG. 2 illustrates an exemplary uniform data system (UDS) that may be used to provide data to a system for recording simulated telemetry for traversal of a virtual environment though a content recorder. UDS may also be used to capture telemetry data demonstrating traversal of a virtual environment that can be used within a training dataset for training one or more machine learning models of the pathway generation system 160. Based on data provided by UDS, the pathway generation system 160 can be made aware of how an avatar object can traverse the virtual environment, particularly how human players may attempt to traverse the virtual environment by providing input combinations that cause the avatar object to perform various virtual actions. Furthermore, each interaction between the avatar object with the virtual environment may be associated with the metadata for the type of in-game interaction, location within the in-game environment, and point in time within an in-game timeline, as well as other set pieces, objects, entities, etc., involved. Thus, metadata can be tracked for any of the variety of interactions that can occur between an avatar and a virtual environment during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2, an exemplary console 228 (e.g., a user device 102, which can be a computing device) and exemplary servers 218 are shown. Exemplary servers 218 may include a streaming server 220, a server associated with the pathway generation system 160 including any servers needed to train or host machine learning models of the pathway generation system 160, and an object server 226. In one example, the console 228 may be implemented on platform servers, a cloud server, or on any of the servers 218. The content recorder 203 may receive and record content files 213 onto a content ring buffer 209 that can store multiple content segments, which may be stored as a media file (e.g., MP4, WebM, etc.) by the console 228. Such content files 213 may be uploaded to the streaming server 220 for storage and subsequent streaming or use, though the content files 213 may be stored on any server, a cloud server, any console 228, or any user device 102. Such start times and end times for each segment may be stored as a content time stamp file 214 by the console 228. Such content time stamp file 215 may also include a streaming ID, which matches a streaming ID of the media file 212, thereby associating the content time stamp file 214 to the media file 212. Such content time stamp file 215 may be sent to the pathway generation system 160, though the content time stamp file 215 may be stored on any server, a cloud server, any console 228, or any user device 102.

Concurrent to the content recorder 203 receiving and recording content from the interactive content title 230, an object library 204 receives data from the interactive content title 230, and an object recorder 206 tracks the data to determine when an object begins and ends. The object library 204 and the object recorder 206 may be implemented on platform servers, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the object data onto an object ring-buffer 210 (e.g., ObjectID1, START_TS; ObjectID2, START_TS; ObjectID3, START_TS). Such object data recorded onto the object ring-buffer 210 may be stored in the object file 216. Such object file 216 may also include activity start times, activity end times, an activity ID, activity results, activity types (e.g., tutorial interaction, menu access, competitive match, quest, task, etc.), user or peer data related to the activity. For example, an object file 216 may store data regarding an in-game skill used, an attempt to use a skill, or success or failure rate of using a skill during the activity. Such object file 216 may be stored on the object server 226, though the object file 216 may be stored on any server, a cloud server, any console 228, or any user device 102.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. In another example, an object file 216 and a content time stamp file 214 may be associated by the user device 102 during creation of each file 216, 214. The activity files captured by UDS 200 may be accessed by platform servers as to the game map, the game title, the specific activity being engaged by the avatar object in a game environment of the game title, and in-game activities.

Figure 3:
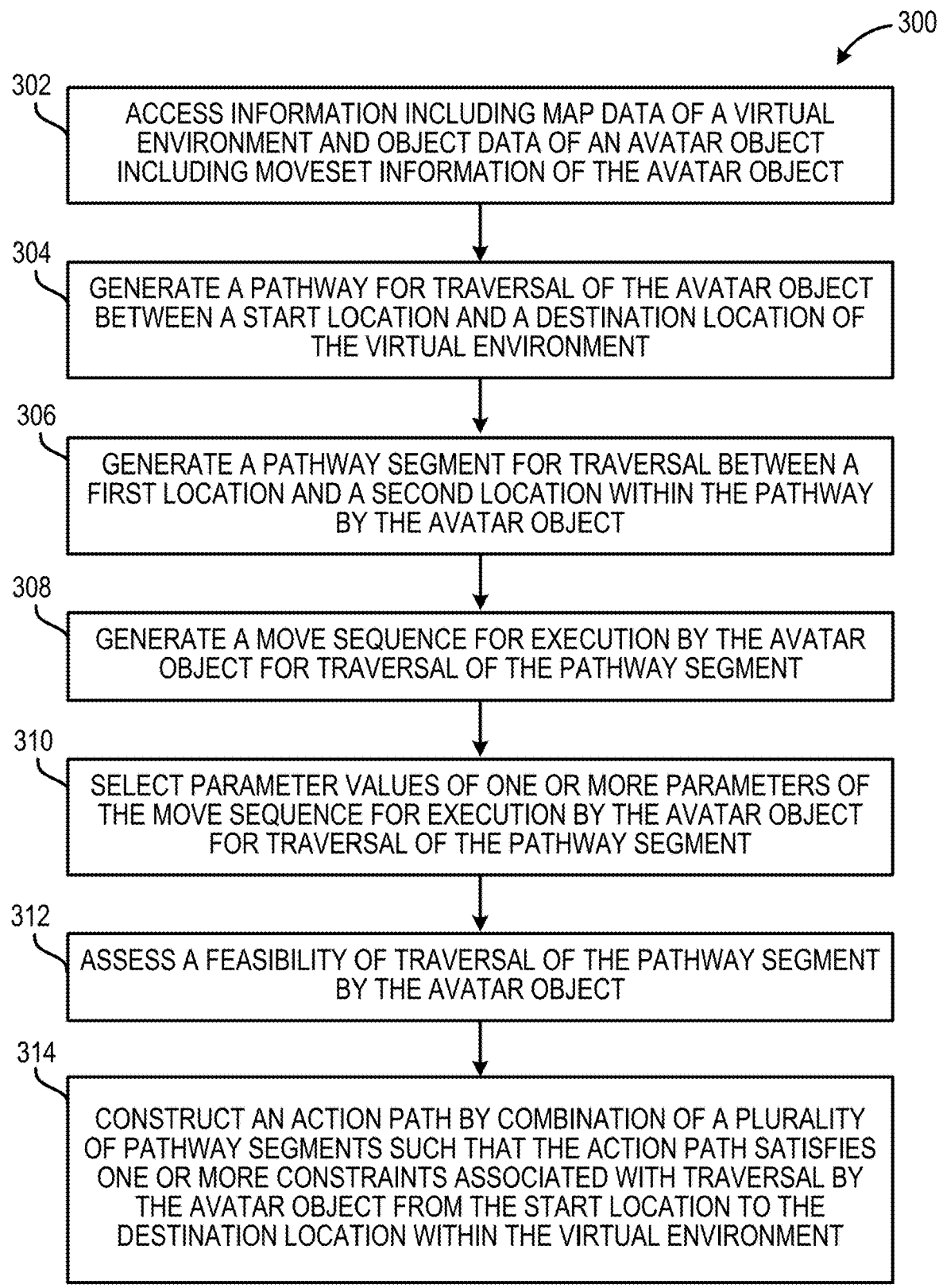
FIG. 3 is a flowchart illustrating an exemplary method for action path generation.

FIG. 3 is a flowchart illustrating an exemplary method 300 for action path creation for traversal of an avatar object through a virtual environment, according to some aspects of the present disclosure. The steps identified in FIG. 3 are exemplary and may include various alternatives, equivalents, or derivations thereof including but not limited to the order of execution of the same. The steps of the process of FIG. 3 and any alternative similar processes may be embodied in hardware or software including a computer-readable storage medium including instructions executable by the likes of a processor in a computing device.

Figure 8:
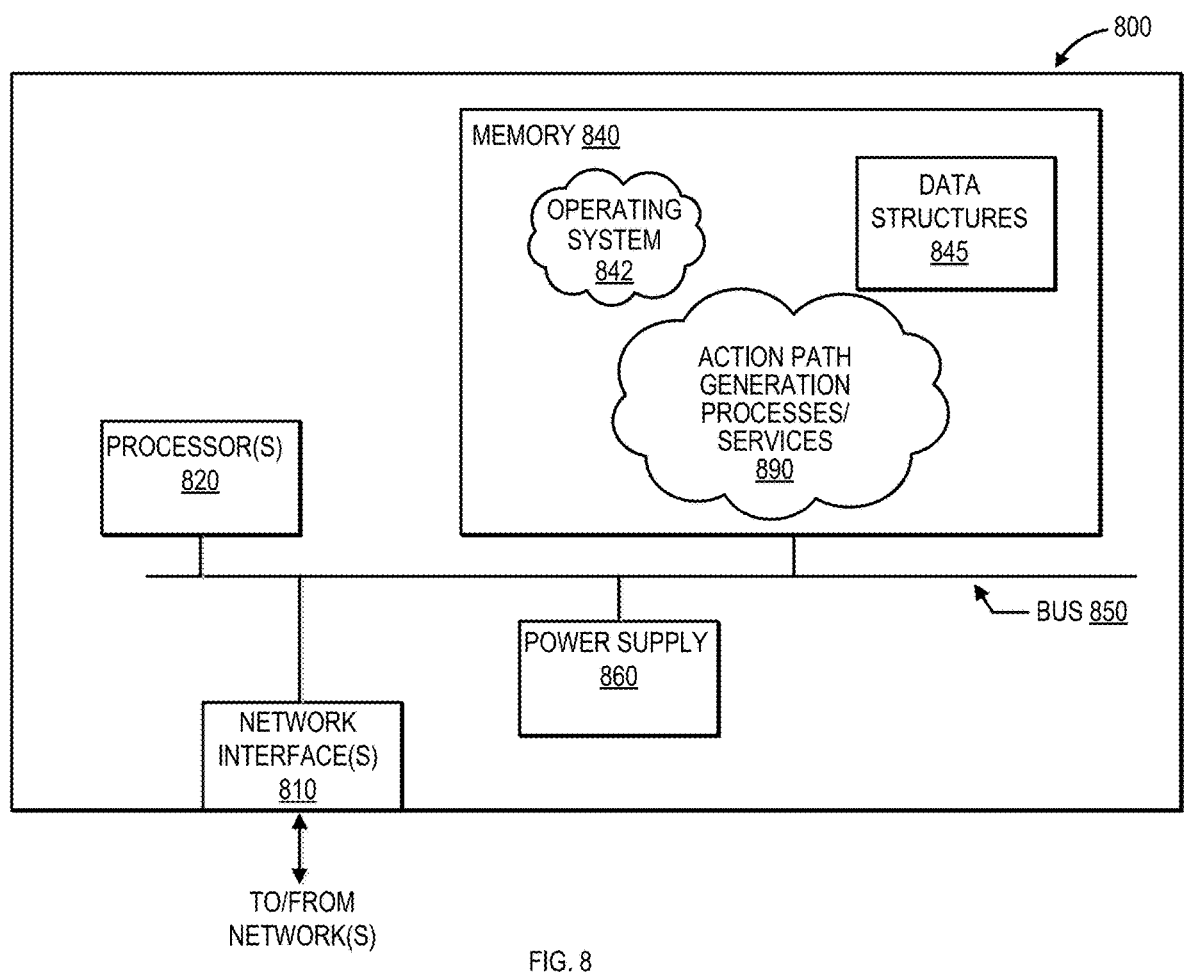
FIG. 8 is a simplified diagram showing an example user device for implementation of the systems and methods outlined herein.

Step 302 of method 300 includes accessing, by a processor in communication with a memory, information including interactive content data (e.g., interactive content data 120 of FIG. 1) which can encompass map data of a virtual environment and object data of an avatar object including moveset information of the avatar object. The processor and memory can be components of a user device (e.g., user device 102 of FIG. 1, where the processor and memory are shown in FIG. 8). The map data of the virtual environment can include, and is not limited to, collision data and information about any other set pieces that may be part of the virtual environment but may not be present in all collision data. Examples may include moving platforms and other objects that an avatar object may interact with that may affect traversal, such as "grappling hook" engagement points, doors, and ladders.

Step 304 of method 300 includes generating, for an iteration of a plurality of iterations, a pathway for traversal of the avatar object between a start location and a destination location of the virtual environment. The systems outlined herein may generate and evaluate a plurality of pathways over the plurality of iterations to find different possible ways that an avatar object could traverse the virtual environment based on the map data and based on aspects of the avatar object such as a moveset of the avatar object. In some examples, the step of generating the pathway for traversal of the avatar object can be performed using a machine-learning model that receives the map data and information describing aspects of the avatar object such as a moveset of the avatar object, and generates one or more possible pathways between the start location and the destination location based on the received inputs. The machine learning model can be trained to generate the one or more possible pathways using labeled, semi-labeled, or un-labeled data which can include telemetry data with examples of traversal of an avatar object having the same or similar moveset through a virtual environment; the virtual environments used for training can be similar to or can even include the virtual environment being examined. In some examples, as a part of or following step 304, the method 300 can include identifying an obstacle within the pathway based on the map data. Similarly, obstacle identification can be performed by a machine learning model that receives the map data (and may also receive information describing aspects of the avatar object such as a moveset of the avatar object), and identifies one or more possible obstacles within the map data based on the received inputs. In some examples, obstacles may be labeled within the map data by a developer, however there may be scenarios in which a structure within the map data may unintentionally become an obstacle if the avatar object would be unable to traverse the structure.

Step 306 of method 300 can include generating, for an iteration of the plurality of iterations, a pathway segment of a plurality of pathway segments of the pathway for traversal between a first location and a second location within the pathway by the avatar object. For the same "general" pathway, multiple different pathway segments can be considered, and more than one pathway segment between the first location and the second location may be viable. Step 306 can be accomplished by decomposing the pathway between the start location and the destination location into the plurality of pathway segments, each respective pathway segment of the plurality of pathway segments including a first location and a second location within the virtual environment. However, in some cases, a pathway might only have one pathway segment. In some embodiments, pathway segment generation can be at least in part informed by any obstacles identified within the pathway based on the map data. For example, traversal of an obstacle present within the pathway might be accomplished in different ways, such as moving around the obstacle (e.g., to the left or right of the obstacle), jumping, or climbing over the obstacle. Possible pathway segments for traversing the obstacle can be generated based on on the obstacle, the moveset of the avatar object, and the virtual environment surrounding the obstacle. A first location of a pathway segment may include a location "before" the obstacle, and a second location of the pathway segment may include a location "after" the obstacle. Similarly, the step of generating pathway segments of the pathway (which can include decomposition) can be performed using a machine learning model that receives information about the pathway as input and outputs a plurality of possible pathway segments of the pathway. In some examples, inputs provided to the machine learning model can also include, but are not limited to, the map data, information describing aspects of the avatar object such as the moveset of the avatar object, and information about any obstacles within the pathway.

For traversal of a pathway segment, the avatar object will need to execute a move sequence which can be selected from one or more moves of a moveset of the avatar object. Step 308 of method 300 can include generating or otherwise selecting, for the iteration of the plurality of iterations, a move sequence for execution by the avatar object for traversal of the pathway segment. The move sequence can be selected and/or generated based on the map data and the object data of the avatar object, and can also be selected based on any obstacles within the pathway segment when applicable. The move sequence can correspond with input combinations and sequences of virtual actions that may be executed by a player controlling the avatar object when traversing the pathway segment. The move sequence can be as simple as "walking", "flying", "running" or "driving" along the pathway segment, but can also include other moves or virtual actions that may be executed by the avatar object such as crouching, waiting or being idle for an interval of time or with regard to an event (such as a waiting for a moving platform to arrive within reach of the avatar object). Other moves or virtual actions can include, for example: attacking, dodging, or using a skill. Move sequence selection can be performed by a machine learning model that receives a pathway segment, map data, and moveset information of the avatar object as input and outputs a move sequence that may be executed by the avatar object for traversal of the pathway segment. The machine learning model may be trained using telemetry data with examples of traversal of a virtual environment using different move sequences.

A move sequence may have one or more parameters for execution of the move sequence, such as those related to timing, approach angle and/or speed, intended direction, force, etc. Step 310 of method 300 can include selecting, for the iteration, parameter values of one or more parameters of the move sequence for traversal of the pathway segment based on the obstacle within the pathway segment, the map data, and the object data of the avatar object. In some examples, step 310 may be performed concurrently with step 308, and may be applied by the machine learning model that selects the move sequence or a different machine learning model. The machine learning model can receive a pathway segment, map data, and moveset information of the avatar object as input and outputs parameter values of a move sequence that may be executed by the avatar object for traversal of the pathway segment. The machine learning model may be trained using telemetry data with examples of traversal of a virtual environment using different move sequences and different parameter values.

Step 312 of method 300 can include assessing a feasibility of traversal of the pathway segment by the avatar object based on the move sequence, the map data, and the object data of the avatar object. To determine whether a pathway segment is traversable by the avatar object using a given move sequence and associated parameter values, the system can provide the move sequence, the map data, the object data of the avatar object as input to a machine learning model that is operable for determining or evaluating feasibility of traversal. In some examples, determining or evaluating feasibility of traversal can include assigning a feasibility score, which may be a binary value or may be on a scale. The machine learning model can be trained using examples of pathways with move sequences and parameter values that may be labeled with a feasibility score. In some embodiments, the machine learning model can incorporate parameter values into the evaluation.

In some examples, step 312 can also include varying the move sequences and/or parameter values of the move sequence to evaluate feasibility of different move sequences and/or parameter values for the same pathway segment, and assessing an allowable input variability for control of the avatar object based on feasibility of traversal across a plurality of parameter values and one or more move sequences for the plurality of iterations. The machine learning model that evaluates a feasibility of the pathway segment may be able to vary the move sequences and/or parameter values of the move sequence. In other examples, the machine learning model may evaluate a general feasibility of the pathway segment, with variations in parameter values for feasible segments being evaluated using an iterative simulation process. Based on the allowable input variability, the system can determine a degree of ease of traversal of the pathway segment. In a further aspect, step 312 can also include varying or modifying the first location and/or the second location of the pathway segment when evaluating feasibility and/or allowable input variability.

Step 314 of method 300 can include constructing an action path by combination of one or more pathway segments such that the action path satisfies one or more constraints associated with traversal by the avatar object from the start location to the destination location within the virtual environment. The constraints associated with traversal can be set by the developer, and may include constraints such as "find a shortest pathway", "find a pathway that can be traversed the fastest", "find an easiest pathway", "find a pathway that cannot be reliably traversed", "find a pathway that the avatar object can get stuck on", "find a pathway that does not require use of X skill", etc. In other examples, the developer may not have any specific constraints in mind and may be looking for any feasible pathway between a starting location and a destination location, with refinement being part of a later step in a general development process. Constructing action paths can include combining pathway segments that result in the action path from the start location to the destination location and satisfy the constraints, and may be achieved using a machine learning model trained to identify or otherwise construct the action path given one or more pathway segments as input. Inputs can also include, for example, the map data and object information of the avatar object. In some embodiments, constructing the action path can include simulating traversal of an entire pathway or a pathway segment by the avatar object with the selected move sequence and selected parameter values and recording telemetry data representing traversal of the avatar object along the pathway or pathway segment. The telemetry data can be exported for further analysis by developers.

The functions performed in the processes and methods may be implemented in differing order. Furthermore, the outlined steps and operations are provided as examples, and some of the steps and operations may be optional, combined into fewer steps and operations, or expanded into additional steps and operations without detracting from the essence of the disclosed embodiments.

Figure 4:
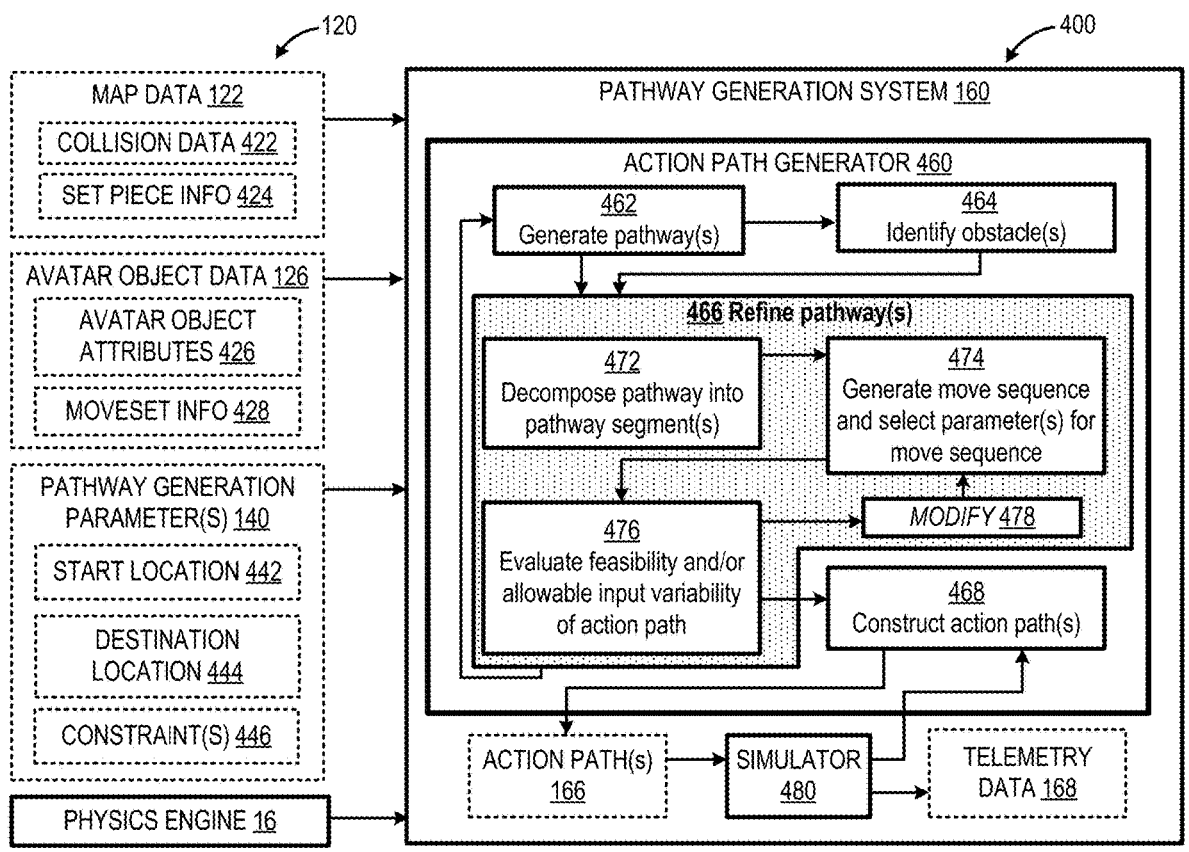
FIG. 4 illustrates operation of a machine-learning enabled pathway generation system for action path generation.
Figure 5A:
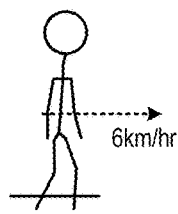
FIGS. 5A-5F illustrate various example movesets with known attributes for an avatar object according to a walkthough example for action path generation.
Figure 5B:
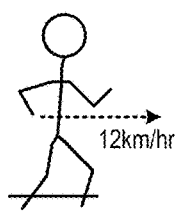
Figure 5C:
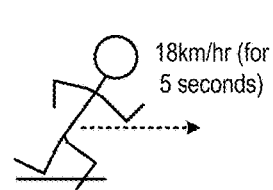
Figure 5D:
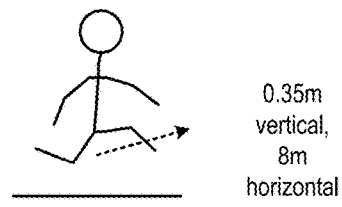
Figure 5E:
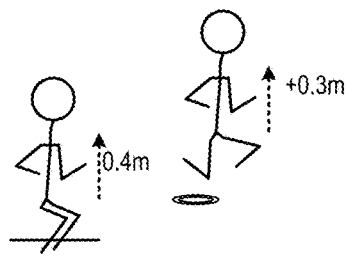
Figure 5F:
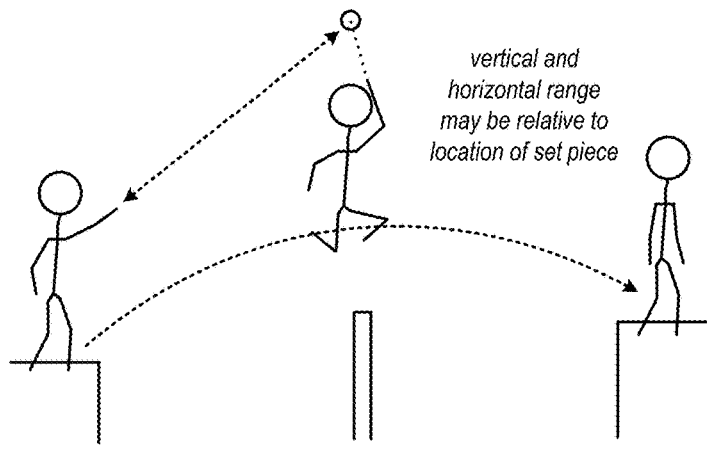

FIG. 4 shows a diagram 400 that further outlines operation of the pathway generation system 160, e.g., for execution of method 300 shown in FIG. 3. As shown, the pathway generation system 160 can include an action path generator 460 that accesses or otherwise receives interactive content data (e.g., interactive content data 120 shown in FIG. 1) that includes map data 122 and avatar object data 126. Based on the map data 122 and avatar object data 126, and further based on pathway generation parameter(s) 140 and logic imposed by the physics engine 16, the pathway generation system 160 generates action path(s) 166 for traversal of the virtual environment by the avatar object. The action path generator 460 can include one or more machine learning models that collectively (or in singularity) generate the action path(s) 166 based on map data 122, avatar object data 126, and/or pathway generation parameter(s). Action path(s) 166 can include, for example, a navigation mesh or other data structure having positional data over time that represents an action path. Action path(s) 166 may also include information about a move sequence and parameter values of the move sequence that correspond to one or more instances of positional data and/or one or more time steps. In some examples, the action path(s) 166 may describe ranges of acceptable or feasible values. In some examples, the pathway generation system 160 can simulate traversal according to the action path(s) 166 and generate telemetry data 168 that results from simulated traversal of the virtual environment.

The map data 122 can include collision data 422 that defines spatial information about the virtual environment, such as surfaces, walls, and other structures that can be touched by the avatar object. In some examples, collision data 422 can describe a 2-D or 3-D environment through vertices of various structures within the virtual environment.

When applicable, map data 122 can also include set piece information 424 (abbreviated as "set piece info 424" in FIG. 4) that can describe attributes and operation of various interactive set pieces associated with the virtual environment, especially those that affect traversal but may not be present within the collision data 422 such as moving platforms, doors, levers, grappling hook engagement points, and the like. In some examples, interactive set pieces can include movable objects that can obstruct traversal, such as objects that may collide with the avatar object to "knock" the avatar object off of a ledge if not avoided or "kill floors" that will "kill" the avatar object or will otherwise require re-start from a checkpoint if collided with (e.g., if the avatar object jumps or falls onto it). In other examples, interactive set pieces can include moveable objects that can aid the avatar object in traversal, such as a moving platform that can carry the avatar object from one location to another or an engagement point for the avatar object to use a skill or item for traversal. For some virtual environments, the avatar object may be required to divert from an obvious path to engage or activate an interactive set piece to enable traversal of the virtual environment.

The avatar object can be an object representing the player character, and/or can represent a non-playable character (NPC) or an "enemy" within the virtual environment. The avatar object data 126 can include avatar object attributes 426 of the avatar object that can affect traversal, such as but not limited to physical dimensions, movement speeds, in-game skills or tools available, damage absorption or negation (e.g., including "fall damage" or damage from environmental factors such as lava, etc.), game progress and status-based attributes (e.g., "stamina bars" and associated depletion/replenishment rates, etc.).

The avatar object data 126 can further include moveset information 428 (abbreviated as "moveset info 428" in FIG. 4) that can define various moves and animations that can be performed by the avatar object for traversal. Each move of the moveset can have known attributes defined within the moveset information 428 including travel distances, travel heights, speeds, and other physical or non-physical attributes. For example, moveset information 428 for a move of the avatar object may include, e.g., animation data, physics data, minimum/maximum speed, travel distance, travel height, turn radius, "hitbox" data defining vulnerabilities and collision information for the avatar object, "invincibility frames", execution speed or latency, move cancellation availability or latency, and dependencies with respect to other moves (such as those that can only be initiated as part of a "combo"). Moveset information 428 can also relate to a status of the avatar object, such as stamina depletion during execution of a move or a lowered speed resulting from being over-encumbered, etc.

Further, moveset information 428 can relate to the virtual environment, such as lowered movement speed when moving through sludge or changes in physics associated with a move when on a slippery surface. Some moves of the moveset can be subject to a set of physics rules enforced by the physics engine 16 that dictate how the avatar object moves within the virtual environment based on various attributes of the avatar object (e.g., as defined by the avatar object data 126). For example, if the avatar object includes a vehicle that is moving along a track of the virtual environment at a high speed and a sharp turn is initiated without braking, the avatar object may slide along the track in a manner that follows the set of physics rules enforced by the physics engine 16. The physics engine 16 may apply different effects to the moveset of the avatar object based on a status of the avatar object and/or based on the virtual environment. For example, moves executed by the avatar object while on a slippery surface of the virtual environment may have different attributes such as reduced stability and may result in initiation of sliding moves as enforced by the physics engine 16. In another example, moves executed by the avatar object while traveling through sludge of the virtual environment may result in reduced speed, reduced travel distance, and reduced travel height associated with some moves as enforced by the physics engine.

A move sequence of the avatar object can define a sequence of moves of the moveset, along with one or more parameters associated with execution of one or more moves of the sequence of moves, that can be executed in sequence by the avatar object within the virtual environment. Some moves of the moveset can be initiated and executed at any point, while other moves may require certain conditions be met in order to initiate. For example, a double jump may only be performed directly after a jump and while the avatar object is in the air, and may only allow initiation of the double jump within a certain interval of time after the jump. In another example, a running jump may only be initiated after the avatar object has been running for a certain duration of time. Further, some move sequences may include combinations or simultaneous execution of one or more moves. For example, a running jump may be executed by simultaneous execution of a running move and a jumping move.

Parameters of the move sequence can include, for a move of the move sequence, an approach speed, an approach angle, and a timing for execution of the move. For some moves, parameter values may be fixed based on one or more factors such as attributes of the avatar object or the virtual environment or the type of move. For other moves, parameter values may vary based on player input and context.

In some examples, the pathway generation parameter(s) 140 include parameters for the action path(s) 166, such as start location(s) 442, destination location(s) 444, and constraint(s) 446 on the action path(s) 166 such as those associated with time to complete, difficulty, in-game or real-life skills required, restricted areas, etc. The pathway generation parameter(s) 140 can also include, for example, expected parameters of a console or other device that consumers will use to play the video game level, and may also be related to rules enforced by the physics engine 16.

Constraints 446 associated with traversal can be set by the developer, and may include finding a shortest, easiest or fastest pathway. Conversely, constraints 446 may include finding a pathway that cannot be reliably traversed, a pathway that the avatar object can get stuck on, etc. Constraints 446 may include finding pathway that does not require use of certain skills or that avoids damage taken, etc. In other examples, the pathway generation parameter(s) 140 may indicate that the user is looking for any feasible pathway between the start location 442 and the destination location 444, with refinement being part of a later step in a general development process.

In the non-limiting example of FIG. 4, at block 462 the action path generator 460 generates a pathway for traversal of the avatar object between the start location 442 and the destination location 444 of the virtual environment. The action path generator 460 can iteratively generate new pathways between the start location 442 and the destination location 444 for evaluation and refinement. In some examples, the action path generator 460 can include a machine-learning model that is trained to generate initial pathways based on map data 122 and avatar object data 126.

At block 464, the action path generator 460 can identify one or more obstacles present within the map data 122 that affect traversal along the pathway of the virtual environment by the avatar object. Obstacles may include anything that cannot simply be walked or driven over without some form of intervention such as gaps, walls, or objects. In some examples, obstacles may be associated with interactive set pieces, such as the need for the avatar object to "wait" until a moving platform arrives at a certain location before proceeding, avoidance of a moving object that can obstruct progress if collided with, or a door that the avatar object can only open if they first retrieve a key. The action path generator 460 can also include a machine-learning model that is trained to identify obstacles within the virtual environment based on map data 122 and avatar object data 126.

At block 466, the action path generator 460 of the pathway generation system 160 can evaluate and/or refine pathways, by iteratively suggesting and evaluating pathway segments of the pathway and move sequences for execution by the avatar object for traversal of the virtual environment. In the non-limiting example of FIG. 4, pathway refinement is illustrated using blocks 472-478. As such, at block 472 the action path generator 460 decomposes the pathway into one or more pathway segments based on the pathway and any obstacles. Each pathway segment can define a first location (e.g., defining a beginning of the pathway segment) and a second location (e.g., defining an end of the pathway segment). A beginning of one pathway segment can coincide with an end of another pathway segment. Further, for any portion of the (overall) pathway, there may be more than one valid pathway segment that may be followed by the avatar object. In a simplified example, the action path generator 460 may identify an obstacle in the form of a boulder in the pathway where three pathway segments respectively associated with diverting right or left around or climbing over the boulder may or may not be equally viable. As such, the one or more machine learning models of the action path generator 460 may be operable to decompose the pathway into one or more pathway segments in view of the map data 122, the avatar object data 126, the pathway generation parameter(s) 140, and any obstacles. Because there may be an overwhelming amount of possible pathway segments, the action path generator 460 may apply a pruning or selection process to select a subset of pathway segments.

Referring to block 474, the action path generator 460 can further generate a move sequence and/or select parameters of the move sequence to be performed by the avatar object for traversal of the of the virtual environment. For a given pathway segment, there may be multiple moves that the avatar object could perform to traverse the pathway segment. For many pathway segments, simply "walking" or "running" along the pathway segment may be sufficient. For others, such as those associated with obstacles, other moves of the moveset may be required with varying levels of precision. For example, if the pathway segment includes a gap that the avatar object must "jump" across (e.g., identified as an obstacle), the action path generator 460 may select a move sequence that includes: (a) running at a particular speed along the pathway segment in a "forward" direction towards the gap; and (b) initiating a running jump at a particular location in front of the gap in the "forward" direction. Parameters of the move sequence can include a sequence of execution of moves of the move sequence, as well as other values such as approach angle, approach speed, and initiation location for each move of the move sequence.

Selection of the move sequence and associated parameters may be dependent upon the geometry defined within the map data 122 including dimensions and attributes of any obstacles, as well as the avatar object data 126 and rules outlined by the physics engine 16. In some implementations, in-game objects may correspond to one or more predefined geometry objects or combinations of the same. For a given pathway segment, there may be more than one valid move sequence with associated parameters, or there may be none. In some embodiments, the one or more machine learning models of the action path generator 460 trained to select a move sequence and associated parameters for a pathway segment based on one or more of: the map data 122 (including one or more obstacles identified at a previous step), the avatar object data 126, rules enforced by the physics engine 16, and the pathway generation parameter(s) 140.

At block 476, the action path generator 460 can conduct a feasibility assessment for traversal of a pathway segment in view of the move sequence and parameter selection for the pathway segment. In some examples, this can be achieved by checking the move sequence and parameters for feasibility against the map data 122, the avatar object data 126, the pathway generation parameter(s) 140, and rules enforced by the physics engine 16. For embodiments where the move sequence and parameters are selected using a machine-learning guided process, the action path generator 460 can apply further checks for ensuring that only feasible cases are eventually used to construct the action path 166. The action path generator 460 may conduct the feasibility assessment using logic associated with geometry, the physics engine 16, moveset information 428, and such. For example, to determine if a gap can be traversed using a move sequence and parameters defining a running jump, the action path generator 460 may examine a distance across the gap with respect to a known travel distance of a running jump under the parameters of the moveset, as well as contextual information such as how much "runway" space the avatar object may have to gain enough speed to make the jump. In some examples, the action path generator 460 may output a feasibility score associated with the pathway segment and the move sequence. The machine learning model(s) of the action path generator 460 can be trained to determine a feasibility score for traversal of the pathway segment with the move sequence and parameters based on one or more of: the map data 122 (including one or more obstacles), the avatar object data 126, the physics engine 16, and the pathway generation parameter(s) 140.

In some examples, the action path generator 460 may determine that a pathway segment with the move sequence and parameters is feasible or infeasible. Following feasibility assessment of a pathway segment for an iteration of the plurality of iteration, at block 478 the action path generator 460 may vary or modify the move sequence and/or parameters of the move sequence across further iterations to try different approaches and/or assess an allowable input variability. For example, to traverse a gap, the action path generator 460 can suggest different approach speeds, approach angles, initiation locations, timing, and move sequences to assess outcomes associated with each. Variations in move sequences and/or parameters from further iterations can also be considered to assess a degree of feasibility. In some embodiments, the action path generator 460 can vary move sequences and/or parameter values by a stochastic process to introduce randomness, e.g., to emulate realistic variations in human control inputs. The action path generator 460 can also vary move sequences and/or parameter values in a "sweeping" process to determine what ranges of move sequences and parameter values result in success or failure. In some examples, the machine learning model(s) of the action path generator 460 can be trained to select variations of move sequences and/or parameter values for feasibility assessment, and may aim to avoid trivial or insignificant variations to maximize usefulness of suggested move sequences and/or parameter values and conserve computational resources associated with feasibility assessment.

In some examples, the action path generator 460 can keep track of successful and unsuccessful move sequences and/or parameter values, and can provide an overall feasibility score for a given pathway or pathway segment that can indicate a degree of ease of traversal of the pathway or pathway segment. For example, if a pathway segment can be successfully traversed across a wide range of move sequences and/or parameter values, this may indicate that this pathway segment can be reliably traversed by a player with relative ease. Conversely, if a pathway or pathway segment can be successfully traversed but only with a very narrow range of move sequences and parameter values, this may indicate that traversal of this pathway or pathway segment requires relatively high precision by the player.

As further shown with reference to block 468, the action path generator 460 can construct the action path 166 based on the pathway segment(s). The action path generator 460 can select feasible pathway segment(s) with move sequence(s) and parameters that, when combined, result in the action path 166 that satisfies the pathway generation parameter(s) 140 (e.g., starts at the start location 442, ends at the destination location 444, and satisfies constraints 446 when possible). The action path generator 460 may identify more than one action path 166 formed from different pathway segment(s) and different move sequence(s) and parameters. In some examples, the action path generator 460 may consolidate a plurality of valid action paths into one or more action paths 166 by denoting where reasonable variations and ranges of inputs may be used to traverse the virtual environment. If no action path is found to be feasible across a plurality of iterations or satisfy the pathway generation parameter(s) 140, the action path generator 460 may construct one or more "best option" action paths that denote one or more areas or pathway segment(s) that could be feasible upon modification of the map data 122 or avatar object data 126.

In some examples, the pathway generation system 160 can also include a simulator 480 that simulates traversal of pathways (e.g., pathways being considered as candidates, pathway segments, action paths) by the avatar object according to a selection of move sequences and parameters. The simulator 480 can incorporate the map data 122, the avatar object data 126, rules outlined by the physics engine 16, and (when applicable) the pathway generation parameter(s) 140. The simulator 480 can be used to export telemetry data 168 that can be useful for the developer. In some examples, to conserve computational resources associated with simulation, the action path generator 460 may only provide feasible cases to the simulator 480. In other examples, especially when little to no feasible cases appear to be available, the simulator 480 can be useful to developers by allowing simulation of infeasible cases and providing insight as to what changes, if any, should be made to allow or preclude traversal of the virtual environment. These settings may be provided to the simulator 480 by the user.

FIGS. 5A-5F illustrate various example movesets with known attributes for an avatar object (e.g., as defined within avatar object data 126 shown in FIG. 4).

A "walk" move of the moveset (FIG. 5A) can include, for example, walking animation data, a walking speed, a turn radius, and hitbox data. A "run" move (FIG. 5B) of the moveset can similarly include running animation data, a running speed, a turn radius, and hitbox data. In some examples, a run move of the moveset can relate to a status of the avatar object such as stamina depletion (e.g., depleting stamina over time as the avatar object executes the run move, and returns when the avatar object stops running). Further, in some examples, there may be more than one "walk" or "run" move within the moveset that may be differentiated by characteristics of inputs provided by the "player" and that may require a dedicated sequence of inputs, such as a double-tap and subsequent hold of a button that may initiate a "dash" (FIG. 5C) where the avatar object temporarily runs at a greater speed before returning to a default "running" speed.

A "jump" move of the moveset can include "jump" animation data, travel height, speed, travel distance associated with the jump move and hitbox data (e.g., that may lift away from the "ground" with the avatar object during a jump). The "jump" move may also define, for example, jumping latency that defines a time between an input that initiates the jump move and a time that the jump move begins. Likewise, there may be more than one jump move within the moveset that may be differentiated by characteristics of inputs provided by the player and that may require a dedicated sequence of inputs, such as a "running jump" (FIG. 5D) that results from initiating the jump move while the avatar object is running and that may result in a greater travel distance. Another example can be a "double jump" (FIG. 5E) move that can only be initiated directly after the jump move while the avatar object is in the "air" and may result in a greater height and greater travel distance. The travel height and travel distance associated with the double jump move can be dependent upon parameters related to timing and directionality, such as when the double jump move is initiated after initiation of the (initial) jump and an approach angle (e.g., if the avatar object "turns" towards another direction as the double jump move is initiated then the double jump move may follow that direction).

Other moves that can be included within the moveset that can be executed during traversal can include various attacks, crouching, sliding, defensive moves such as dodging, quick-stepping/backstepping or rolling. The moveset can also include specialized skill moves such as using a grappling hook (FIG. 5F) that can engage with interactive set piece(s) to propel the avatar object from one location within the virtual environment to another, or initiating a skill that shoots the avatar object upwards into the "air" to quickly gain height. Each of these moves can have various known attributes that define or otherwise affect, e.g., animations, travel distance, travel height, avatar hitbox, speed, invincibility, dependencies with respect to other moves, avatar status, etc.

In some contexts, the moveset of the avatar object can include engaging with an interactive set piece that would enable traversal of the virtual environment, such as activating platforms or elevators, opening or closing doors, stepping on a springboard or other object to launch the avatar object upwards, activating a grappling hook, etc.

Figure 6:
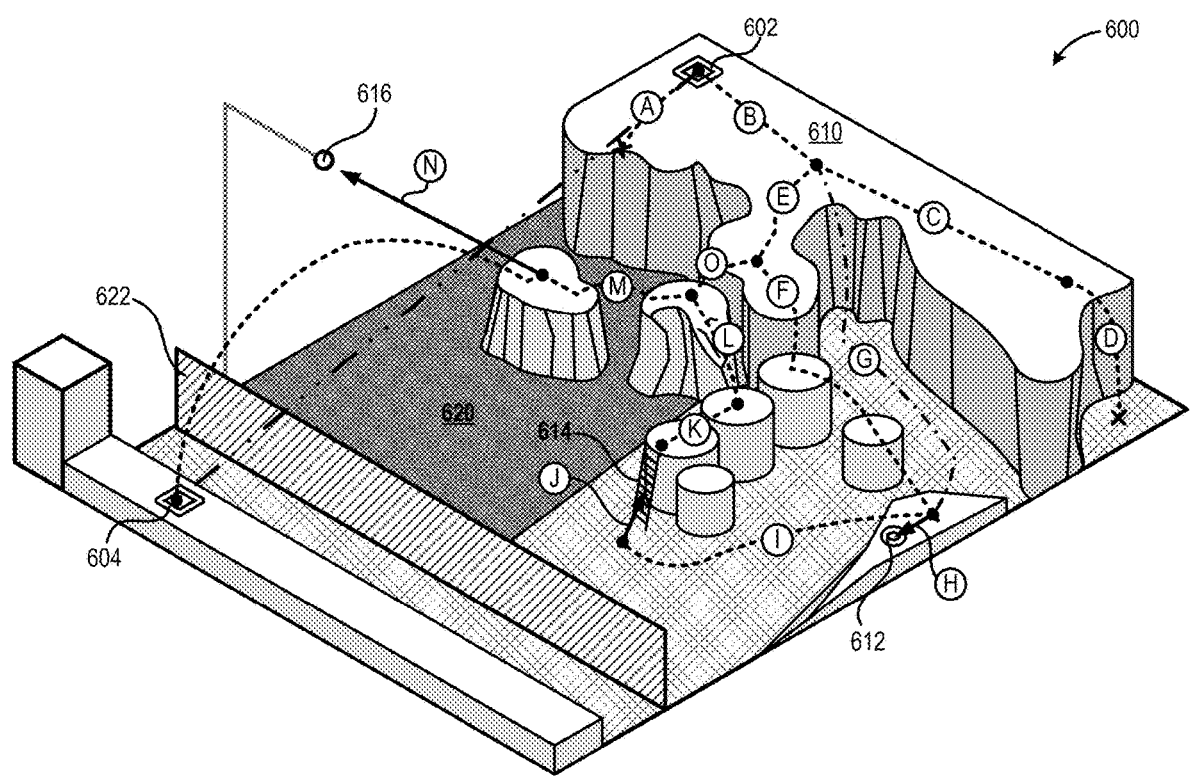
FIG. 6 illustrates an example pathway for traversal of a virtual environment according to a walkthough example for action path generation.

FIG. 6 shows a non-limiting walkthrough example of a virtual environment 600 with pathways that may be assessed using the methods outlined herein. The movesets shown in FIGS. 5A-5F may be used by an avatar object to traverse the virtual environment 600.

The system can access map data (e.g., map data 122 shown in FIG. 4) that describes the virtual environment 600 and can include collision data and set piece info. As shown, in this non-limiting example, the virtual environment 600 includes a start location 602 and a destination location 604, with a plateau region 610 having several drop-points and smaller platforms, a non-traversable region 620 (e.g., that may eliminate the avatar object upon contact such as "lava", deep water or a "fatal" drop), and a wall 622 that provides a barrier to the destination location 604. The virtual environment 600 can include various set pieces, including an activation plate 612, a ladder 614, and a grappling hook engagement point 616. For the purposes of the illustration, consider that the grappling hook engagement point 616 is not readily available to the avatar object, and that the avatar object must interact with the activation plate 612 in order to access the grappling hook engagement point 616.

The system can start with a general pathway from the start location 602 to the destination location 604. The system may initially consider a pathway segment A with a "walking" or "running" move sequence that follows a straight path to the destination location 604. However, the system can recognize that pathway segment A may not be optimal, as the drop to the non-traversable region 620 might be "fatal", the avatar object may not be able to jump from the first pathway segment A to a safe area, and that without interacting with the activation plate 612 the avatar object will not be able to progress to the destination location 604. The system can then modify the pathway to instead include a pathway segment B which starts at a first location coinciding with the start location 602 and ends at a second location along the plateau region 610 as shown.

From the second location of pathway segment B, there may be multiple possible pathways. Consider pathway segment C, which starts at a first location coinciding with the second location of pathway segment B and ends at a second location above a drop-off point. Pathway segment C connects to pathway segment D, which starts at a first location coinciding with the second location of pathway segment C and ends at a second location along a floor of the virtual environment 600. However, from the second location of pathway segment D, there would be no way forward towards the destination location 604 as the map data and avatar object data indicates that there are no spaces large enough for the avatar object data to traverse and no skills or set pieces that could otherwise aid the avatar object towards the destination location 604. As such, an action path that includes pathway segment C and pathway segment D would not be feasible if the intention is to reach the destination location 604.

However, in other examples, developers may be able to specify within the constraint(s) (e.g., constraint(s) 446 shown in FIG. 4) the need to identify "points of no return" present within the map data—in that case, the system may identify an action path that includes pathway segment C and pathway segment D.

From the second location of pathway segment B, another pathway segment that could be viable is pathway segment E, which starts at a first location coinciding with the second location of pathway segment B and ends at a second location along the plateau region 610. From the second location of pathway segment E, pathway segment F is one option that would lead the avatar object towards the activation plate 612 and does not immediately appear to risk dropping onto the non-traversable region 620 or an area of no return. Pathway segment O that also branches from the second location of pathway segment E is traversable, however, without interacting with the activation plate 612 would not put the avatar object in a position to reach the destination location 604. So, pathway segment F towards the activation plate 612 may be selected.

Pathway segment F involves a drop, but the system may recognize that the drop is not high enough to cause significant (if any) fall damage (e.g., based on the collision data and avatar object attributes) nor does it terminate in a non-traversable region and is thus a safe path. Pathway segment F may also involve one or more jumps, and the system may recognize that these jumps are feasible based on the collision data and avatar object attributes. Pathway segment F ends near the activation plate 612.

Alternatively, pathway segment G starts at the second location of pathway segment B and involves a higher, but non-fatal drop down to the floor, and also terminates near the activation plate 612. Pathway segment G may be equally viable as pathway segment F. There may be incentives for taking pathway segment G, as it may be a faster route with less effort required. However, there may also be incentives for taking pathway segment F such as more items, XP, currency, etc. An action path may indicate either, or both options.

From the ends of pathway segment G and pathway segment F, pathway segment H may involve a move of the moveset of the avatar object for interacting with the activation plate 612. Once activated, the avatar object needs to be able to interact with grappling hook engagement point 616 in order to reach the destination location 604. The system may select pathway segment I, which would route the avatar object to ladder 614 and towards the grappling hook engagement point 616. The avatar object can interact with the ladder at pathway segment J and follow pathway segment K.

From the end of pathway segment K, the only viable pathway towards the grappling hook engagement point 616 may be by pathway segment L. In this example, pathway segment L involves hopping across a gap and climbing up an object with an irregular geometry. The system may select a move sequence and parameters of the move sequence that would successfully traverse the gap and climb up the object without slipping off or falling onto the non-traversable region 620. The end of pathway segment L places the avatar object near the same spot that pathway segment O would have put them. However, as the grappling hook engagement point 616 is now available, there is a path forward. The system may select pathway segment M, which includes a larger gap that can be compensated for with a carefully-timed running jump. As such, for pathway segment M, the system can select a move sequence and parameters of the move sequence that would successfully traverse the gap. From the end of pathway segment M, the system may determine the grappling hook engagement point 616 is within range (e.g., as defined within the map data and within the avatar object data). The system selects pathway segment N, which involves a move where the avatar object interacts with the grappling hook engagement point 616. Depending on factors such as distance to the grappling hook engagement point 616, pathway segment N may also involve walking towards an edge of the platform or even jumping off before interacting with the grappling hook engagement point 616. Any of these may be viable move sequences for pathway segment N, with varying degrees of risk. The grappling hook engagement point 616 can propel the avatar object across the non-traversable region 620, over wall 622, and towards the destination point.

Based on feasibility for the general pathway between starting location 602 and destination location 604, the system can outline an action path that follows:

$$B \to ((E \to F) \text{ OR } (G)) \to H \to I \to J \to K \to L \to M \to N$$

with move sequences and parameters (including ranges of viable move sequences and parameters) for each pathway segment.

Figure 7A:
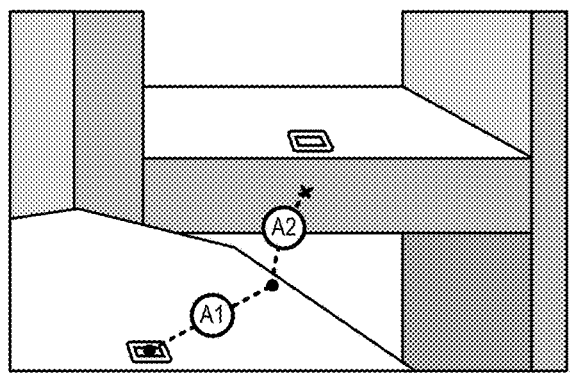
FIGS. 7A-7C illustrate a simplified example with selection and evaluation of pathway segments and associated move sequences and parameters of an action path that includes an obstacle.
Figure 7B:
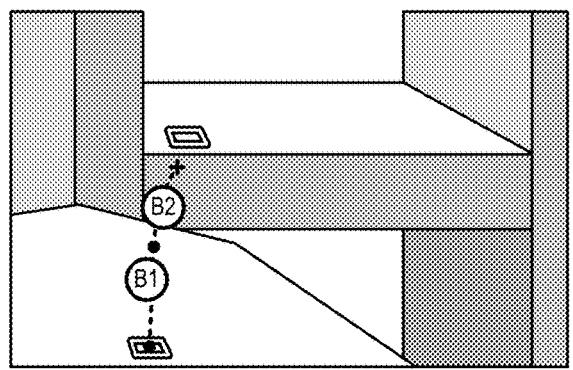
Figure 7C:
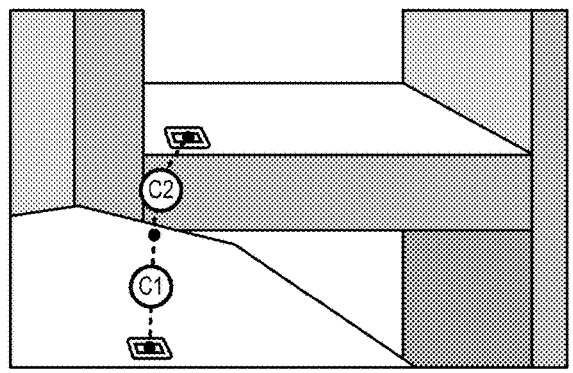

FIGS. 7A-7C illustrate a simplified example with selection and evaluation of pathway segments and associated move sequences and parameters for traversal of an obstacle over three iterations. In this example, the obstacle is a gap between a first platform and a second platform. The system can determine, based on map data and avatar object data, that the jump across the gap is feasible. However, to ensure that the jump can be reliably executed and to determine a degree of ease that the jump can be executed, the system can iteratively suggest and evaluate different move sequences and parameters including approach angels, speeds, and timing.

In FIG. 7A, for a first iteration, the system can suggest pathway segments A1 and A2. Pathway segment A1 includes a "walking" move at a first approach angle and a walking approach speed. Pathway segment A2 includes a "jumping" move with a first initiation point along the first platform and directed at a first target location along the second platform. Upon evaluation by the system, pathway segments A1 and A2 are found to be infeasible.

In FIG. 7B, for a second iteration, the system can suggest pathway segments B1 and B2. Pathway segment B1 includes a "walking" move at a second approach angle and a walking approach speed. Pathway segment B2 includes a "jumping" move with a second initiation point along the first platform and directed at a second target location along the second platform. Upon evaluation by the system, pathway segments B1 and B2 are found to be infeasible. However, pathway segment B2 almost reaches the second platform.

In FIG. 7C, for a third iteration, the system can suggest pathway segments C1 and C2. Pathway segment C1 includes a "running" move at the second approach angle (same as that of pathway segment B1 of FIG. 7B) and a running approach speed. Pathway segment C2 includes a "running jump" move at the second initiation point along the first platform and directed at the second target location along the second platform (same as that of pathway segment B2 of FIG. 7B). Upon evaluation by the system, pathway segments C1 and C2 are found to be feasible.

In the examples of FIGS. 7A-7C, pathway segments A1 and A2 of FIG. 7A had incorrect approach angles, move sequence (e.g., walking instead of running, regular jump instead of running jump), initiation point for pathway segment A2, and target location. Pathway segments B1 and B2 of FIG. 7B had correct approach angles and initiation point for pathway segment B2 but an incorrect move sequence (e.g., walking instead of running, regular jump instead of running jump). Pathway segments C1 and C2 of FIG. 7C had correct approach angles and initiation point for pathway segment C2, as well as a correct move sequence (e.g., running followed by a running jump).

From the successful case of FIG. 7C, additional iterations with different parameters (approach angles, initiation points, etc.) may be considered to determine a range of allowable input variability for successful traversal of the obstacle.

FIG. 8 is a schematic block diagram of an example device 800 that may be used with one or more embodiments described herein, e.g., as a component of design environment 100 and/or as user device 102 shown in FIG. 1.

Device 800 comprises one or more network interfaces 810 (e.g., wired, wireless, PLC, etc.), at least one processor 820, and a memory 840 interconnected by a system bus 850, as well as a power supply 860 (e.g., battery, plug-in, etc.).

Network interface(s) 810 include the mechanical, electrical, and signaling circuitry for communicating data over the communication links coupled to a communication network. Network interfaces 810 are configured to transmit and/or receive data using a variety of different communication protocols. As illustrated, the box representing network interfaces 810 is shown for simplicity, and it is appreciated that such interfaces may represent different types of network connections such as wireless and wired (physical) connections. Network interfaces 810 are shown separately from power supply 860, however it is appreciated that the interfaces that support PLC protocols may communicate through power supply 860 and/or may be an integral component coupled to power supply 860.

Memory 840 includes a plurality of storage locations that are addressable by processor 820 and network interfaces 810 for storing software programs and data structures associated with the embodiments described herein. In some embodiments, device 800 may have limited memory or no memory (e.g., no memory for storage other than for programs/processes operating on the device and associated caches). Memory 840 can include instructions executable by the processor 820 that, when executed by the processor 820, cause the processor 820 to implement aspects of the pathway generation system 160 and the method 300 outlined herein.

Processor 820 comprises hardware elements or logic adapted to execute the software programs (e.g., instructions) and manipulate data structures 845. An operating system 842, portions of which are typically resident in memory 840 and executed by the processor, functionally organizes device 800 by, inter alia, invoking operations in support of software processes and/or services executing on the device. These software processes and/or services may include action path generation processes/services 890, which can include aspects of method 300 and/or implementations of various modules described herein. Note that while action path generation processes/services 890 is illustrated in centralized memory 840, alternative embodiments provide for the process to be operated within the network interfaces 810, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the action path generation processes/services 890 is shown as a standalone process, those skilled in the art will appreciate that this process may be executed as a routine or module within other processes.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

Figure 9:
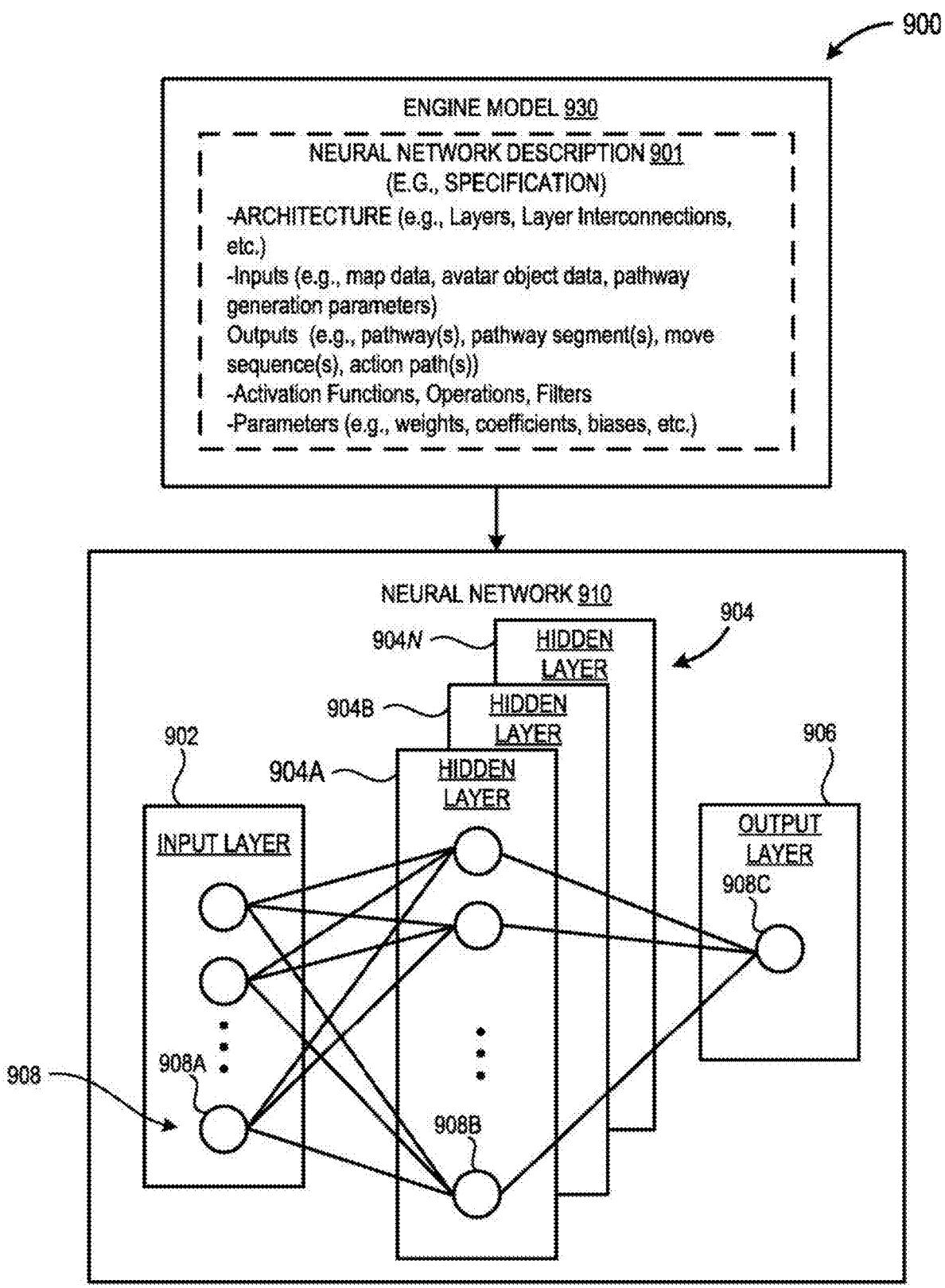
FIG. 9 is a simplified diagram showing an example neural network architecture model for implementation of aspects of systems and methods outlined herein.

FIG. 9 is a schematic block diagram of an example neural network architecture 900 that may be used with one or more embodiments described herein, e.g., as a component of pathway generation system 160 shown in FIG. 1, and particularly as a component of, e.g., action path generator 460 shown in FIG. 4. Action path generator 460 may include one or more machine learning models that may be individually or collectively used to implement aspects of the method 300 shown in FIG. 3 and the operations discussed herein with reference to FIG. 4. In some embodiments, the neural network architecture 900 can be used by the pathway generation system 160 to perform operations such as, but not limited to: generating a pathway for traversal of the avatar object between a start location and a destination location of the virtual environment, identifying an obstacle within the pathway based on the map data, generating a pathway segment of the pathway for traversal between a first location and a second location within the pathway by the avatar object, decomposing the pathway between the start location and the destination location into a plurality of pathway segments, selecting a move sequence for execution by the avatar object for traversal of the pathway segment, assessing a feasibility of traversal of the pathway or pathway segment by the avatar object (e.g., including assigning a feasibility score), varying the move sequences and/or parameter values of the move sequence to evaluate feasibility of different move sequences and/or parameter values for the same pathway segment, and constructing an action path by combination of a plurality of pathway segments.

Architecture 900 includes a neural network 910 defined by an example neural network description 901 in an engine model (neural controller) 930. The neural network 910 can represent a neural network implementation of the action path generator 460, which may include a plurality of neural networks individually or collectively implementing aspects of the machine learning models discussed with reference to FIG. 4. The neural network description 901 can include a full specification of the neural network 910, including the neural network architecture 900. For example, the neural network description 901 can include a description or specification of the architecture 900 of the neural network 910 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 910 reflects the architecture 900 defined in the neural network description 901. In an example corresponding to action path generator 460, the neural network 910 includes an input layer 902, which includes interactive content data 120 that encompasses map data (e.g., of map data 122 shown in FIGS. 1 and 4) and information describing aspects of the avatar object (e.g., of avatar object data 126 shown in FIGS. 1 and 4), with individual data points of the map and data about the avatar object corresponding to one or more nodes 908. In the illustrative example corresponding to the action path generator 460, the input layer 902 can include data representing a portion of input media data such as a portion of the map of the virtual environment and a moveset of the avatar object. The input layer 902 may also include constraint information representing one or more constraints on the result.

The neural network 910 includes hidden layers 904A through 904N (collectively "904" hereinafter). The hidden layers 904 can include n number of hidden layers, where n is an integer greater than or equal to one. The number of hidden layers can include as many layers as needed for a desired processing outcome and/or rendering intent. The neural network 910 further includes an output layer 906 that provides an output resulting from the processing performed by the hidden layers 904. When applicable, the result of the output layer 904 may be constrained or modified based on constraint information provided at the input layer 902 or at a post-processing step that takes the output layer 906 as input. In an illustrative example corresponding to action path generator 460, the output layer 906 can provide information about one or more action path(s) (e.g., action path(s) 166) for traversal of the virtual environment by the avatar object) for traversal of the virtual environment by the avatar object based on a portion of the map of the virtual environment and/or a moveset of the avatar object provided to the input layer 902. Action path(s) may be represented in a suitable form for re-creation and display at the user device 102, such as a navigation mesh or other data structure having positional data over time that represents the action path. The action path may also include information about a move sequence and parameter values of the move sequence that correspond to one or more instances of positional data and/or one or more time steps.

The neural network 910 in this example is a multi-layer neural network of interconnected nodes. Each node can represent a piece of information. Information associated with the nodes is shared among the different layers and each layer retains information as information is processed. In some cases, the neural network 910 can include a feed-forward neural network, in which case there are no feedback connections where outputs of the neural network are fed back into itself. In other cases, the neural network 910 can include a recurrent neural network, which can have loops that allow information to be carried across nodes while reading in input.

Information can be exchanged between nodes through node-to-node interconnections between the various layers. Nodes of the input layer 902 can activate a set of nodes in the first hidden layer 904A. For example, as shown, each of the input nodes of the input layer 902 is connected to each of the nodes of the first hidden layer 904A. The nodes of the hidden layer 904A can transform the information of each input node by applying activation functions to the information. The information derived from the transformation can then be passed to and can activate the nodes of the next hidden layer (e.g., 904B), which can perform their own designated functions. Example functions include convolutional, up-sampling, data transformation, pooling, and/or any other suitable functions. The output of the hidden layer (e.g., 904B) can then activate nodes of the next hidden layer (e.g., 904N), and so on. The output of the last hidden layer can activate one or more nodes of the output layer 906, at which point an output is provided. In some cases, while nodes (e.g., nodes 908A, 908B, 908C) in the neural network 910 are shown as having multiple output lines, a node has a single output and all lines shown as being output from a node represent the same output value.

In some cases, each node or interconnection between nodes can have a weight that is a set of parameters derived from training the neural network 910. For example, an interconnection between nodes can represent a piece of information learned about the interconnected nodes. The interconnection can have a numeric weight that can be tuned (e.g., based on a training dataset), allowing the neural network 910 to be adaptive to inputs and able to learn as more data is processed.

The neural network 910 can be pre-trained to process the features from the data in the input layer 902 using the different hidden layers 904 in order to provide the output through the output layer 906. In an example corresponding to the action path generator 460, in which the neural network 910 is used to infer or generate one or more action paths from the map data and avatar object data provided to the input layer 902, the neural network 910 can be trained using training data that includes example action paths. For instance, training data can be input into the neural network 910, which can be processed by the neural network 910 to generate outputs which can be used to tune one or more aspects of the neural network 910, such as weights, biases, etc.

In some cases, the neural network 910 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 910, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 910 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 910 can perform a backward pass by determining which inputs (weights)

most contributed to the loss of the neural network 910, and can adjust the weights so that the loss decreases and is eventually minimized.

A derivative of the loss with respect to the weights can be computed to determine the weights that contributed most to the loss of the neural network 910. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 910 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 910 can represent any other neural or deep learning network, such as an autoencoder, a deep belief nets (DBNs), and recurrent neural networks (RNNs), etc.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for generating action paths, the method comprising:
    storing information in memory regarding map data of a virtual environment and object data that includes move-set information of an avatar object;
    generating for each of a plurality of iterations, a pathway segment between a first location and a second location of an action path for traversal by the avatar object, the action path including a start location and a destination location;
    generating for each iteration, a move sequence for execution by the avatar object for traversal of the pathway segment, wherein the move sequence comprises one or more moves, each of the moves in the moveset information; and
    generating an assessment regarding feasibility of the avatar object traversing the pathway segment based on the move sequence, the map data, and the object data of the avatar object.

2. The method of claim 1, wherein the pathway segment is one of a plurality of pathway segments for traversing the virtual environment between the first location and the second location, and further comprising identifying the pathway segment of the plurality of pathway segments based on satisfaction of one or more constraints associated with the avatar object traversing the virtual environment from the first location to the second location.

3. The method of claim 1, further comprising constructing the action path by combining a plurality of pathway segments such that the action path satisfies one or more constraints associated with the avatar object traversing the virtual environment from the first location to the second location.

4. The method of claim 3, further comprising:
    generating for each of the plurality of iterations, a pathway between the start location and the destination location, the pathway being one of a plurality of pathways for generation of the action path; and
    decomposing the pathway between the start location and the destination location into the plurality of pathway segments.

5. The method of claim 1, further comprising:
    simulating traversal of the pathway segment by the avatar object with the move sequence and one or more parameter values of the move sequence; and
    recording telemetry data representing traversal of the avatar object along the pathway segment.

6. The method of claim 1, further comprising:
    varying the move sequence for each of the plurality of iterations; and
    varying a parameter value of one or more parameters of the move sequence for each of the plurality of iterations.

7. The method of claim 6, further comprising:
    assessing an allowable input variability for control of the avatar object based on feasibility of traversal across a plurality of parameter values and one or more move sequences for the plurality of iterations; and
    determining a degree of ease of traversal of the pathway segment based on the allowable input variability.

8. The method of claim 1, further comprising modifying for each of the plurality of iterations, the first location or the second location of the pathway segment.

9. The method of claim 1, further comprising:
    identifying an obstacle within the pathway segment based on the map data;
    selecting the move sequence based on the obstacle within the pathway segment, the map data, and the object data of the avatar object; and
    selecting parameter values of one or more parameters of the move sequence based on the obstacle within the pathway segment, the map data, and the object data of the avatar object.

10. A system for generating action paths, the system comprising:
    memory that stores information regarding map data of a virtual environment and object data that includes move-set information of an avatar object; and
    a processor that executes instructions stored in memory, wherein the processor executes the instructions to:
    generate for each of a plurality of iterations, a pathway segment between a first location and a second location of an action path for traversal by the avatar object, the action path including a start location and a destination location;
    generate for each iteration, a move sequence for execution by the avatar object for traversal of the pathway segment, wherein the move sequence comprises one or more moves, each of the moves in the moveset information; and
    generate an assessment regarding feasibility of the avatar object traversing the pathway segment based on the move sequence, the map data, and the object data of the avatar object.

11. The system of claim 10, wherein the pathway segment is one of a plurality of pathway segments for traversing the virtual environment between the first location and the second location, and wherein the processor executes further instructions to identify the pathway segment of the plurality of pathway segments based on satisfaction of one or more constraints associated with the avatar object traversing the virtual environment from the first location to the second location.

12. The system of claim 10, wherein the processor executes further instructions to construct the action path by combining a plurality of pathway segments such that the action path satisfies one or more constraints associated with the avatar object traversing the virtual environment from the first location to the second location.

13. The system of claim 12, wherein the processor executes further instructions to:
   generate for each of the plurality of iterations, a pathway between the start location and the destination location, the pathway being one of a plurality of pathways for generation of the action path; and
   decompose the pathway between the start location and the destination location into the plurality of pathway segments.

14. The system of claim 10, wherein the processor executes further instructions to:
   simulate traversal of the pathway segment by the avatar object with the move sequence and one or more parameter values of the move sequence; and
   record telemetry data representing traversal of the avatar object along the pathway segment.

15. The system of claim 10, wherein the processor executes further instructions to:
   vary the move sequence for each of the plurality of iterations; and
   vary a parameter value of one or more parameters of the move sequence for each of the plurality of iterations.

16. The system of claim 15, wherein the processor executes further instructions to:
   assess an allowable input variability for control of the avatar object based on feasibility of traversal across a plurality of parameter values and one or more move sequences for the plurality of iterations; and
   determine a degree of ease of traversal of the pathway segment based on the allowable input variability.

17. The system of claim 10, wherein the processor executes further instructions to modifying for each of the plurality of iterations, the first location or the second location of the pathway segment.

18. The system of claim 10, wherein the processor executes further instructions to:
   identify an obstacle within the pathway segment based on the map data;
   select the move sequence based on the obstacle within the pathway segment, the map data, and the object data of the avatar object; and
   select parameter values of one or more parameters of the move sequence based on the obstacle within the pathway segment, the map data, and the object data of the avatar object.

19. A non-transitory computer-readable storage medium having instructions executable by a computing system to perform a method for generating an action path, the method comprising:
   storing information in memory regarding map data of a virtual environment and object data that includes move-set information of an avatar object;
   generating for each of a plurality of iterations, a pathway segment between a first location and a second location of an action path for traversal by the avatar object, the action path including a start location and a destination location;
   generating for each iteration, a move sequence for execution by the avatar object for traversal of the pathway segment, wherein the move sequence comprises one or more moves, each of the moves in the moveset information; and
   generating an assessment regarding feasibility of the avatar object traversing the pathway segment based on the move sequence, the map data, and the object data of the avatar object.

20. The non-transitory computer-readable storage medium of claim 19, further comprising instructions executable to construct the action path by combining a plurality of pathway segments such that the action path satisfies one or more constraints associated with the avatar object traversing the virtual environment from the start location to the destination location.

* * * * *